(No Model.)
F. S. D. BROUGHTON.
NUT LOCK.
No. 324,295. Patented Aug. 11, 1885.
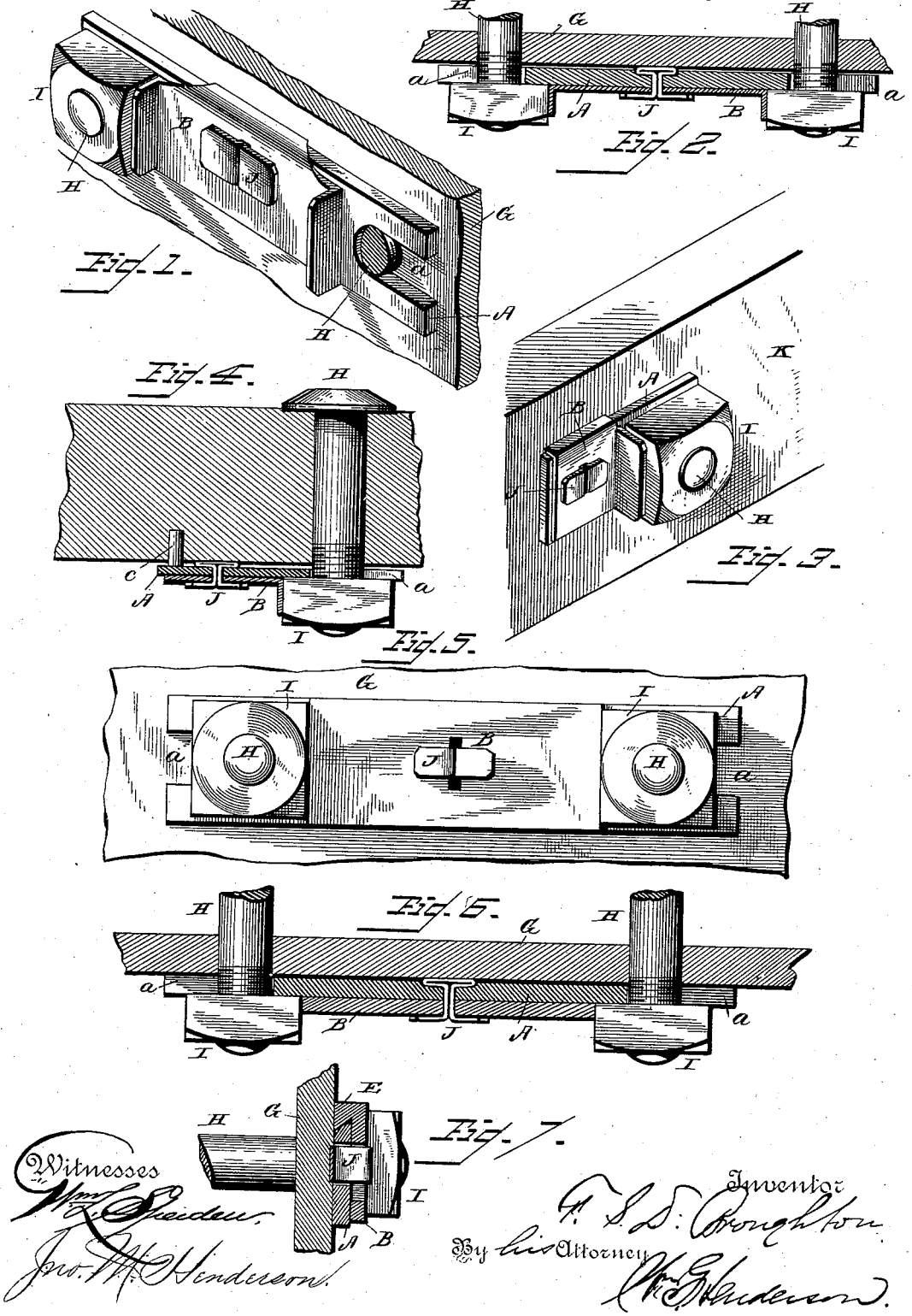

UNITED STATES PATENT OFFICE.

FREDERICK S. D. BROUGHTON, OF SUNBURY, PENNSYLVANIA, ASSIGNOR OF ONE-HALF TO S. P. WOLVERTON, OF SAME PLACE.

NUT-LOCK.

SPECIFICATION forming part of Letters Patent No. 324,295, dated August 11, 1885.

Application filed September 5, 1884. (No model.)

*To all whom it may concern:*

Be it known that I, FREDERICK S. D. BROUGHTON, a citizen of the United States, residing at Sunbury, in the county of Northumberland and State of Pennsylvania, have invented certain new and useful Improvements in Nut-Locks; and I do hereby declare the following to be a full, clear, and exact description of the invention, such as will enable others skilled in the art to which it appertains to make and use the same, reference being had to the accompanying drawings, forming a part hereof, in which—

Figure 1 is a perspective view showing the manner of applying the lock. Fig. 2 is a horizontal section of the same. Fig. 3 is a perspective of a modified form, showing it applied to a timber; Fig. 4, a section of the same; Fig. 5, a side view of another modification; Fig. 6, a horizontal section of the same; and Fig. 7, a cross-section of the same.

My invention relates to nut-locks, and has for its object to provide a lock for nuts, whether used in connection with railroads or elsewhere, which shall be simple in construction and cheap of production, easy and quick to be applied, and strong and effective, to absolutely prevent the accidental turning or loosening of the nut on the bolt.

The invention consists in the construction and the combination of parts hereinafter particularly described, and then specifically defined by the claim.

In the accompanying drawings, the letter A indicates the base or washer plate formed at one or both ends with an elongated or other shaped opening, a, for the passage of a bolt, said opening extending from the outer edge of the plate inwardly, or formed wholly within said edge, as may be preferred, although the first construction is deemed the best.

The base or washer plate has attached to it by any suitable means a supplemental or locking plate, B, adapted to be brought with its end bearing against the side or shoulder of a nut, so as to prevent the same from being accidentally unscrewed from its bolt by frequent vibrations of the parts it secures, or from other causes. It is preferred to use means for securing the locking-plate to the washer-plate which will permit the two plates to be separated or the locking-plate readily removed from the side of the nut when it is desired to loosen or farther tighten the nut on its bolt.

In Fig. 1 the lock is shown applied to a rail fish-plate, G, the base plate resting against the fish-plate, and having the bolts H passed through it, while the opposite end, S, of the locking-plate bears against the sides of the nuts I and prevents the same from turning.

Another method of attaching the locking-plate to the base or washer plate is to form the locking-plate with a hook at its upper edge, in the shape of a flange, which will lap over the top edge of the base or washer plate, so as to support or suspend the other plate therefrom and brace the connection between the two plates. In such form the key J will be used, the same having two lips which may be spread apart, so as to lap over the locking-plate, and a head to prevent it from passing clear through the slots or openings made in the base and locking plates for the passage of the lips. This form of plate may have its ends square, or made with curved, or, as illustrated in Fig. 1, with angular flanges to bear against the sides of the nuts. It is applied by placing the washer-plate in position with the key through the same, then screwing down the nuts, then attaching the locking-plate, and afterward bending the lips of the key so as to lap over the plate.

To detach the lock the lips are straightened and the locking-plate lifted off.

In Fig. 3 of the drawings is illustrated the application of the lock to a single nut, the construction and operation being the same as the form illustrated in Fig. 1, one end being turned or curved up to bear against the side of the nut. There is also shown a pin, c, on the under side of the base or washer plate to enter a hole made in the timber K or other body, through which the bolt passes, so as to make the connection therewith more fixed than it otherwise would be. This pin, however, might be omitted, and it may, if so desired, be used in the other modified forms illustrated.

In the form illustrated in Fig. 5 the top edge of the base-plate is recessed between its ends and the inner face of the recessed edge beveled, and the hook to the locking-plate is formed by a flange on the inner face and along the upper edge, which flange is beveled from its lower edge upwardly and toward the body of the plate, so that the two beveled edges will meet and prevent the locking-plate from being pulled out from the base-plate till it is slightly raised. The two plates are further held together by a key, as in the other form, the slot for the key being slightly deeper than the width of the lips, so as to allow for the proper movement of the locking-plate in adjusting it to its place on the base-plate.

The principle of the base-plate serving as a washer, and having the locking-plate attached thereto, so as to be separated therefrom, runs through all the forms.

The key may be of any desired form or character that will serve the purpose, and, if desired, a rivet might be used, but the form illustrated is a good form.

The several parts are made of iron or sheet metal or other suitable material formed by dies or other means into the form desired.

Having described my invention and set forth its merits, what I claim is—

A nut-lock composed of a base-plate adapted to serve as a washer, a locking-plate adapted to bear against the end of a nut, and having a hook lapping over the edge of the base-plate, and a key formed with a head, and adapted to pass through both plates and have its ends bent down upon the locking-plate, substantially as described.

In testimony whereof I affix my signature in presence of two witnesses.

FREDERICK S. D. BROUGHTON.

Witnesses:
  GEO. H. NEFF,
  U. P. HILLBISH.